United States Patent
Kwon

(10) Patent No.: US 7,962,940 B2
(45) Date of Patent: Jun. 14, 2011

(54) APPARATUS AND METHOD FOR SWITCHING CHANNELS IN A DIGITAL BROADCASTING SYSTEM

(75) Inventor: Hung-Rok Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1208 days.

(21) Appl. No.: 11/446,378

(22) Filed: Jun. 5, 2006

(65) Prior Publication Data

US 2007/0016923 A1    Jan. 18, 2007

(30) Foreign Application Priority Data

Jul. 12, 2005   (KR) .................. 10-2005-0062848

(51) Int. Cl.
 G06F 3/00    (2006.01)
 G06F 13/00   (2006.01)
 H04N 5/445   (2006.01)
(52) U.S. Cl. .............. 725/57; 725/38; 725/52; 725/100; 725/131; 725/67; 725/68; 725/70; 725/71
(58) Field of Classification Search .................. 725/38, 725/52, 57, 100, 131, 67–68, 70–71; 348/731
 See application file for complete search history.

(56) References Cited

U.S. PATENT DOCUMENTS

| | | | | |
|---|---|---|---|---|
| 4,959,720 A * | 9/1990 | Duffield et al. | ................. | 725/57 |
| 5,045,947 A * | 9/1991 | Beery | .............................. | 725/57 |
| 5,191,423 A * | 3/1993 | Yoshida | ........................... | 725/57 |
| 5,528,304 A * | 6/1996 | Cherrick et al. | ................ | 725/41 |
| 5,600,573 A * | 2/1997 | Hendricks et al. | ............ | 725/109 |
| 5,625,422 A * | 4/1997 | Kim | ................................. | 725/57 |
| 6,708,336 B1 * | 3/2004 | Bruette | ........................... | 725/57 |
| 6,766,526 B1 * | 7/2004 | Ellis | ................................. | 725/57 |
| 7,057,673 B1 * | 6/2006 | Weber | .......................... | 348/734 |
| 7,224,409 B2 * | 5/2007 | Chin et al. | ..................... | 348/732 |
| 7,281,259 B2 * | 10/2007 | Takagi et al. | .................... | 725/38 |
| 7,568,212 B2 * | 7/2009 | Tsubouchi | ...................... | 725/38 |
| 2004/0187161 A1 * | 9/2004 | Cao | ................................. | 725/110 |
| 2006/0010477 A1 * | 1/2006 | Yu | ................................... | 725/87 |
| 2006/0090181 A1 * | 4/2006 | Oh | ................................... | 725/39 |
| 2007/0094696 A1 * | 4/2007 | Sakai | ............................ | 725/118 |

FOREIGN PATENT DOCUMENTS

| JP | 10-136276 | 5/1998 |
|---|---|---|
| KR | 1998-0007582 | 3/1998 |

OTHER PUBLICATIONS

Advanced Television Systems Committee, ATSC Recommended Practice: Program and System Information Protocol Implementation Guidelines for Broadcasters, Jun. 25, 2002, Doc. A/69, pp. 26-30.*

* cited by examiner

Primary Examiner — Jason P Salce
(74) Attorney, Agent, or Firm — H.C. Park & Associates, PLC

(57) ABSTRACT

An apparatus and a method for switching channels in a digital broadcasting system. The apparatus and method of the invention can convert an abridged channel name comprised of alphabetic letters, or a combination of alphabetic letters and Arabic numbers, inputted by a user, into a corresponding channel number and switches into a digital broadcasting channel at a tuner according to the channel number so that a user can easily switch broadcast channels.

14 Claims, 6 Drawing Sheets

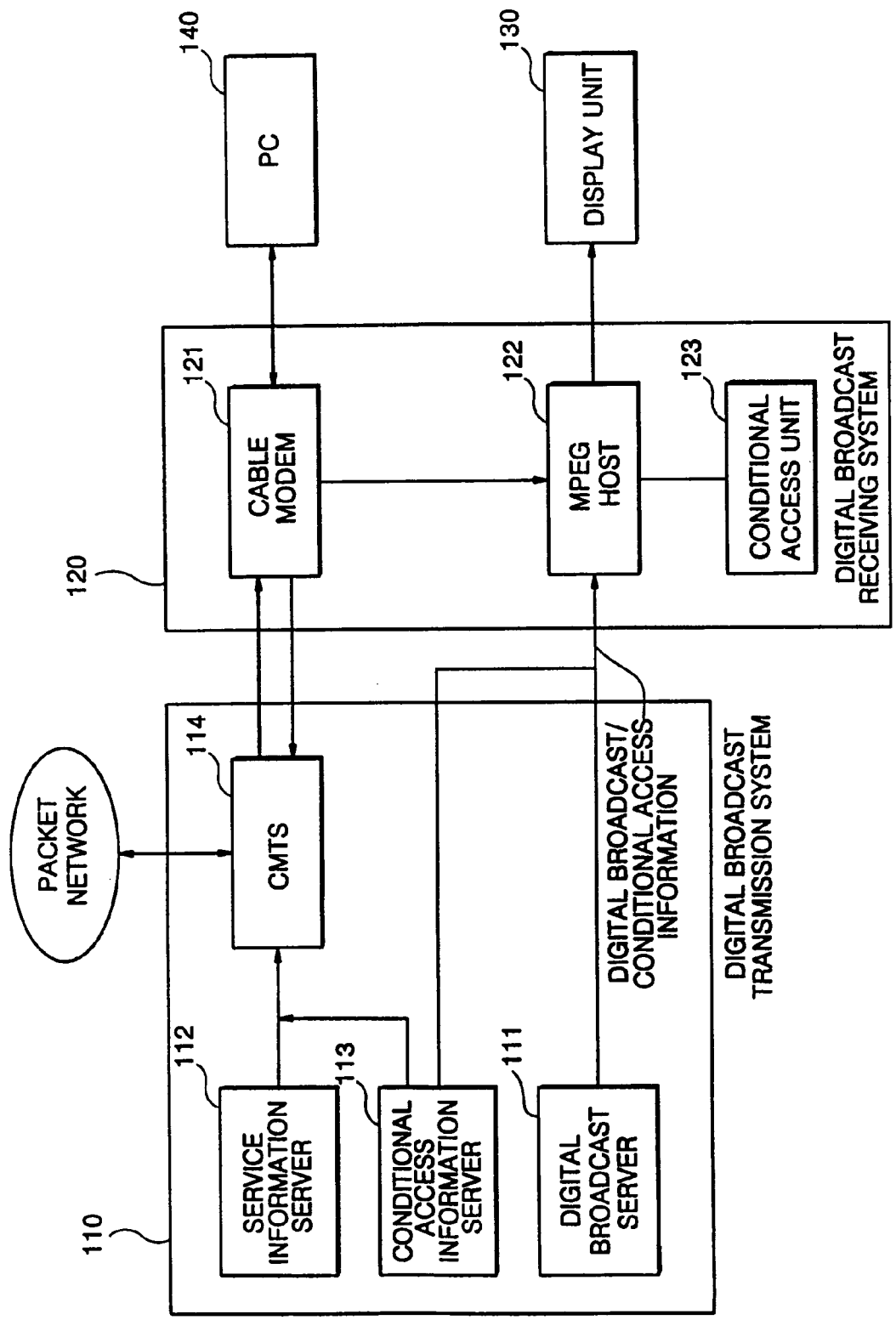
FIG. 1 *(Background Art)*

APPARATUS AND METHOD FOR SWITCHING CHANNELS IN A DIGITAL BROADCASTING SYSTEM

CLAIM OF PRIORITY

This application makes reference to, incorporates the same herein, and claims all benefits accruing under 35 U.S.C. §119 from an application for APPARATUS AND METHOD FOR CHANGING THE CHANNEL IN DIGITAL BROADCASTING SYSTEM earlier filled in the Korean Intellectual Property Office on 12 July, 2005 and there duly assigned Serial No. 10-2005-0062848.

BACKGROUND OF THE INVENTION

1. Field of the Invention

The present invention relates to an apparatus and a method for switching channels in a digital broadcast system.

2. Description of the Related Art

A digital broadcasting system refers to a television broadcasting system that provides broadcasting by compressing multimedia signals into a digital format by which information signals are written in codes. A conventional analogue television broadcasting system has been able to transmit one image on one channel, but use another channel to broadcast voice. In addition to this, the digital broadcasting system can transmit a plurality of images and voices in one channel while compressing multimedia information without quality degradation. As a result, the digital broadcasting system has an advantage of setting about 4 to 8 channels in a frequency bandwidth corresponding to a single analogue broadcast channel of the prior art. In addition, the use of a computer facilitates multimedia information transmission, and enables information demanded by a viewer to be transmitted via a digital transmission system. The digital broadcasting system compresses images and voices as well as modulates several signals, in which communication and PCs adopt equal compression and multiple-modulation techniques.

In order to provide better services to audience, such a digital broadcasting system transmits additional System Information (SI) such as channel information together with multimedia data compressed by a Moving Picture Experts Group (MPEG) technique. In particular, by containing program information currently being broadcasted or to be broadcasted to users in such system information, it is possible to provide Electronic Program Guide (EPG) services.

An open cable digital broadcasting system according to, for example, known standards in Korea, generally includes a digital broadcast transmitting system and a digital broadcast receiving system such as a set top box.

The digital broadcast transmission system may include a digital broadcasting server or an audio/video server, a system information server, a conditional access server and a Cable Modem Termination System (CMTS).

The audio/video server is a device for compressing multimedia signals to transmit. The system information server is adapted to transmit service information of a broadcast channel, and the conditional access server allows only specific users to access specific or all contents. The CMTS is a cable head end, converting cable modem data into Internet data packets.

The digital broadcast receiving system is a device to interpret and display broadcasting and service information transmitted from the head end installed in the digital broadcast transmission system for the purpose of cable TV or cable modem services provided to subscribers. The digital broadcast receiving system may generally include a cable modem, a Moving Picture Experts Group (MPEG) host and a conditional access unit.

The cable modem connects a PC (personal computer) to a cable TV line, enabling the PC to download data up to a rate of about 10 Mbps. The MPEG host serves to separate and demodulate multimedia data out of data received from the MPEG host, and then display it via a display unit such as a TV. The MPEG host interprets service information of input data to display it. The conditional access unit receives encoded contents from the digital broadcast transmission system, and only if their receipt is authenticated, restores the encoded contents into common images.

In a method of switching broadcast channels in a conventional digital broadcast system in which a user switches channels by inputting channel number personally, the user inputs channel number personally by using an interface such as a remote controller including Arabic number keys. An EPG (electronic program guide) module of the MPEG host of the digital broadcast receiving system, upon receiving channel number, switches channels by performing controlled extraction selectively to a signal corresponding to the input channel number.

In a method of switching broadcast channels in a conventional digital broadcast system in which a user switches channels by using an EPG, the digital broadcast transmission system sends service information to the digital broadcast receiving system. Service information contains various information related with broadcast services such as channel number, channel name, program name, broadcast date, broadcast startup time, program identification number and program description. The EPG module of the digital broadcast receiving system writes a channel guide by collecting service information to output the channel guide via the display unit such as a TV. The user can select a program to watch from service information displayed on the display unit. In this case, the EPG module controls a tuner to selectively extract a signal corresponding a channel selected by the user.

As described above, channel switching by a user personally inputting channel number has a problem in that users have to memorize channel numbers. Furthermore, there is inconvenience in that users also have to memorize channel numbers whenever channel numbers are changed according to areas and times of digital broadcasting services. In the meantime, EPG channel switching requires users to examine service information of a number of digital broadcast channels one by one, thereby disadvantageously consuming a long-term period.

SUMMARY OF THE INVENTION

The present invention has been made to solve the foregoing problems and it is therefore an object of the present invention to provide an apparatus and a method for switching channels that can convert abridged channel name inputted by a user into corresponding channel number to switch into a digital broadcasting channel desired by the user.

According to an aspect of the invention for realizing the above objects, there is provided a digital broadcast receiving system that stores system information on abridged names and corresponding channel numbers of digital broadcast channels, and executes steps of searching the stored system information for an abridged name inputted by a user, converting the inputted abridged name into a corresponding channel number, and switching channels according to the channel number.

According to another aspect of the invention for realizing the above objects, there is provided a digital broadcast receiving system comprising: a digital broadcast transmission system for collecting channel information provided from at least one broadcaster to generate system information on channel numbers and corresponding abridged channel names and transmitting the system information; and a digital broadcast receiving system for receiving and storing the system information, searching the system information for an abridged channel name inputted by a user, converting the inputted abridged channel name into a corresponding channel number, and switching channels according to the channel number.

According to further another aspect of the invention for realizing the above objects, there is provided a method for switching digital broadcast channels, comprising steps of: storing system information on abridged names and corresponding channel numbers of digital broadcast channels; and if a user inputs an abridged channel name to switch channels, searching the store system information for the inputted abridged channel name, converting the inputted abridged channel name into a corresponding channel number, and switching channels according to the channel number.

According to yet another aspect of the invention for realizing the above objects, there is provided a method for switching digital broadcast channels in a digital broadcast system, comprising steps of: collecting channel information provided from at least one broadcaster, generating system information on channel numbers and corresponding abridged channel names, and transmitting the system information; and receiving and storing the system information, searching the stored system information for an abridged channel name inputted by a user, converting the abridged channel name into a corresponding channel number, and switching channels according to the channel number.

The digital broadcast receiving system of the invention may output an error message if the inputted abridged name does not exist in the stored system information. In addition, the digital broadcast receiving system may further comprise a memory storing at least one selected from a group consisting of channel name, channel description, broadcast program description and program identification number. The digital broadcast receiving system, by using an abridged channel name inputted by a user, may also display channel information corresponding to the inputted abridged channel name.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 1 is a block diagram illustrating an open cable digital broadcasting system;

DETAILED DESCRIPTION OF THE PREFERRED EMBODIMENTS

Figure 2A:
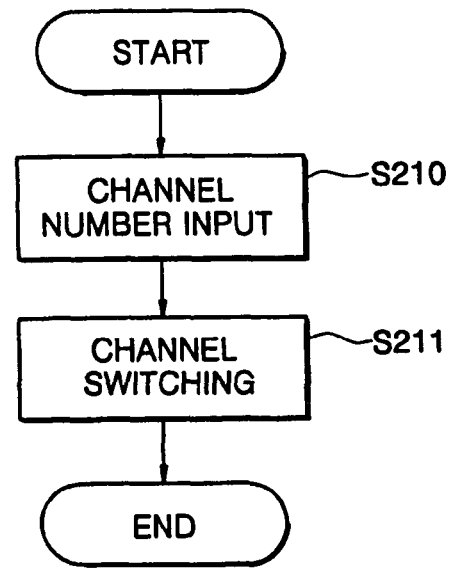
FIG. 2A is a flowchart illustrating a method of switching broadcast channels in a digital broadcast system in which a user switches channels by inputting channel number personally.

FIG. 1 is a block diagram illustrating an open cable digital broadcasting system. The open cable digital broadcasting system includes a digital broadcast transmitting system 110 and a digital broadcast receiving system 120 such as a set top box.

The digital broadcast transmission system 110 may include a digital broadcasting server, or an audio/video server, 111, a service information server 112, a conditional access information server 113 and a Cable Modem Termination System (CMTS) 114.

The audio/video server 111 is a device for compressing multimedia signals to be transmitted. The service information server 112 is adapted to transmit service information of a broadcast channel, and the conditional access information server 113 allows only specific users to access specific or all contents. The CMTS 114 is a cable head end, converting cable modem data into Internet data packets.

The digital broadcast receiving system 120 is a device to interpret and display broadcasting and service information transmitted from the head end installed in the digital broadcast transmission system 110 for the purpose of cable TV or cable modem services provided to subscribers. The digital broadcast receiving system 120 may generally include a cable modem 121, a Moving Picture Experts Group (MPEG) host 122 and a conditional access unit 123.

The cable modem 121 connects a PC 140 to a cable TV line, enabling the PC 140 to download data up to a rate of about 10 Mbps. The MPEG host 122 serves to separate and demodulate multimedia data out of data received from the CMTS 114, and then display it via a display unit 130 such as a TV. The MPEG host 122 interprets service information of input data to display it. The conditional access unit 123 receives encoded contents from the digital broadcast transmission system 110, and only if their receipt is authenticated, restores the encoded contents into common images.

FIG. 2A is a flowchart illustrating a method of switching broadcast channels in a conventional digital broadcast system in which a user switches channels by inputting channel number personally.

The user inputs channel number personally by using an interface such as a remote controller including Arabic number keys in step S210. An EPG module of the MPEG host 122 of the digital broadcast receiving system 120, upon receiving channel number, switches channels by performing controlled extraction selectively to a signal corresponding to the input channel number in step S211.

Figure 2B:
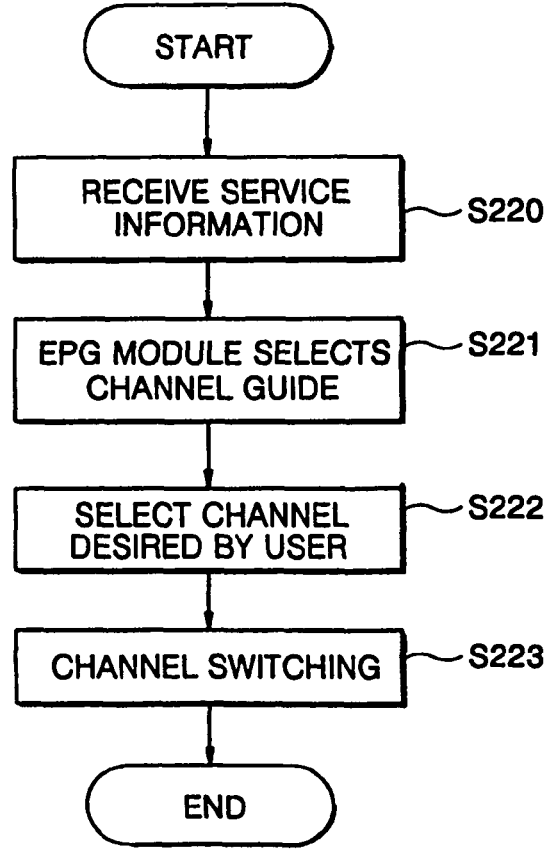
FIG. 2B is a flowchart illustrating a method of switching broadcast channels in a digital broadcast system in which a user switches channels by using an EPG (electronic program guide)

FIG. 2B is a flowchart illustrating a method of switching broadcast channels in a conventional digital broadcast system in which a user switches channels by using an EPG.

In step S220, the digital broadcast transmission system 110 sends service information to the digital broadcast receiving system 120. Service information contains various information related with broadcast services such as channel number, channel name, program name, broadcast date, broadcast startup time, program identification number and program description. The EPG module of the digital broadcast receiving system 120 writes a channel guide by collecting service information to output the channel guide via the display unit 130 such as a TV in step S221. In step S222, the user can select a program to watch from service information displayed on the display unit 130. In this case, the EPG module controls a tuner to selectively extract a signal corresponding a channel selected by the user in step S223.

The following detailed description will present preferred embodiments of a home network system and a control method thereof according to the present invention with reference to the accompanying drawings. The following detailed description will present a channel switching apparatus and a channel switching method in a digital broadcasting system according to the invention with reference to the accompanying drawings.

Figure 3:
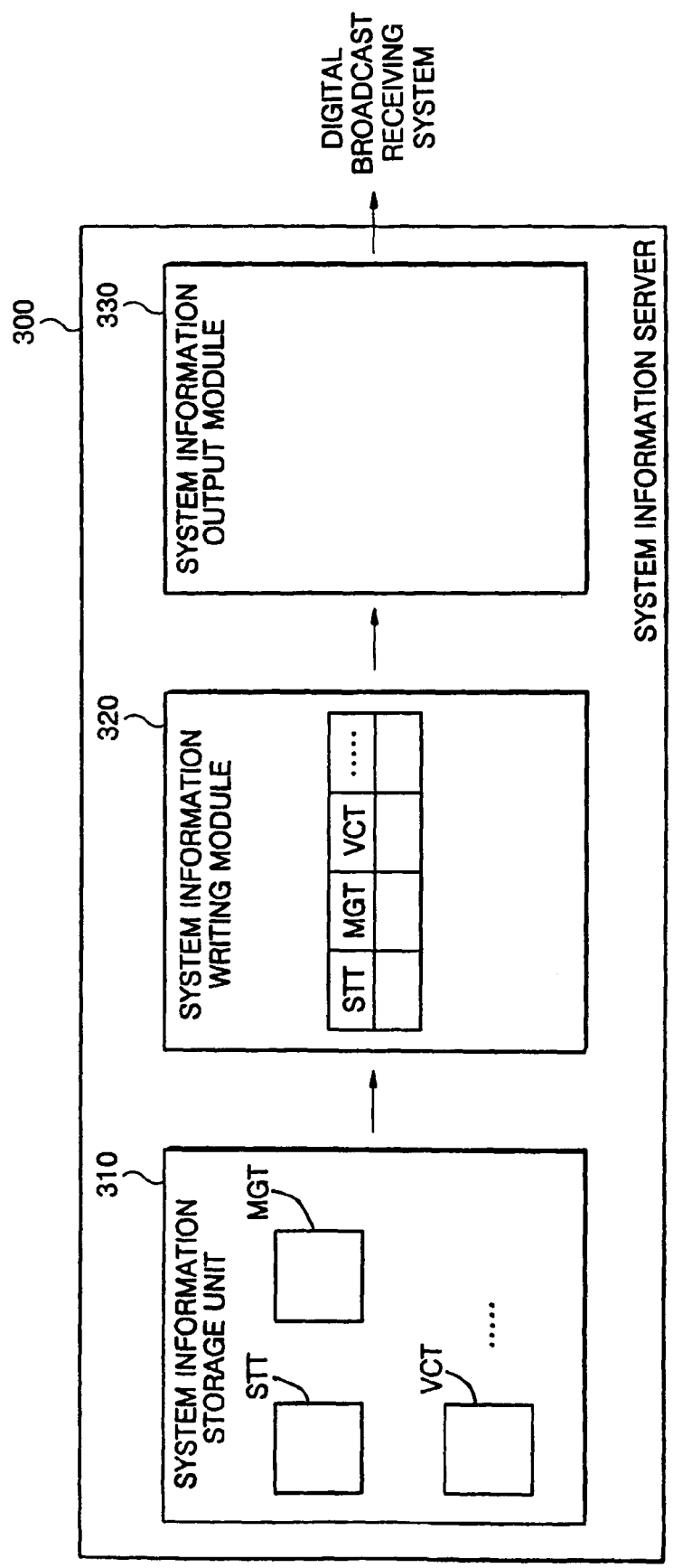
FIG. 3 is a block diagram illustrating a system information server of a digital broadcasting system according to the present invention.

FIG. 3 is a block diagram illustrating a system information server of a digital broadcasting system according to the invention. As shown in FIG. 3, the system information server 300 includes a system information storage unit 310, a system information writing module 320 and a system information output module 330.

The system information storage unit 310 serves to store digital broadcast channel information provided by several broadcasters. The system information storage unit 310 may store system information such as channel name, program name, broadcasting date and broadcasting startup time. Such system information can be stored in a specific format according to a Program and System Information Protocol (PSIP), The system information storage unit 310 of the invention also stores name information of each channel in an abridged form.

PSIP is a small collection of tables, e.g., Virtual Channel Table (VCT) and System Time Table (STT) Program and Master Guide Table (MGT) designed to operate within every Transport Stream (TS) for broadcast of digital television. Its purpose is to describe the information at the system and event levels for all virtual channels carried in a particular TS. Additionally, information for analog channels as well as digital channels from other Transport Streams may be incorporated.

The system information writing module 320 collects channel information provided from the system information storage unit 310 to write standard system information according to PSIP and Program Specific Information (PSI). Program Specific Information is the MPEG data that identifies what parts of the transport stream belong to a particular program. This information is carried in a number of PSI tables. Standard system information written by the system information writing module 320 is transmitted to a system information output module 330.

The system information output module 330 modulates standard system information transmitted from the system information writing module 320 to transmit it to the digital broadcast receiving system.

Now reference will be made of an operation in which the system information server 300 of the above-mentioned elements transmits standard system information including an abridged channel name.

The system information storage unit 310 transmits system information including channel name, program name, broadcasting date and broadcasting startup time to the system information writing module 320. The system information writing module 320 collects system information to write standard system information according to a format defined by PSIP and PSI. For example, channel name information and channel number information are included in a Virtual Channel Table (VCT) of PSIP, and broadcasting startup information and the like are included in an Event Information Table (EIT) of PSIP. In addition, the system information writing module 320 adds an abridged channel name to a private descriptor of a Network Information Table (NIT) correlated with a Virtual Channel Table (VCT) module that stores channel number. As a result, standard system information generated by the system information writing module 320 includes all of channel number and abridged channel name. Standard system information generated like this is transmitted to the system information output module 330 where standard system information is modulated before being transmitted.

Figure 4:
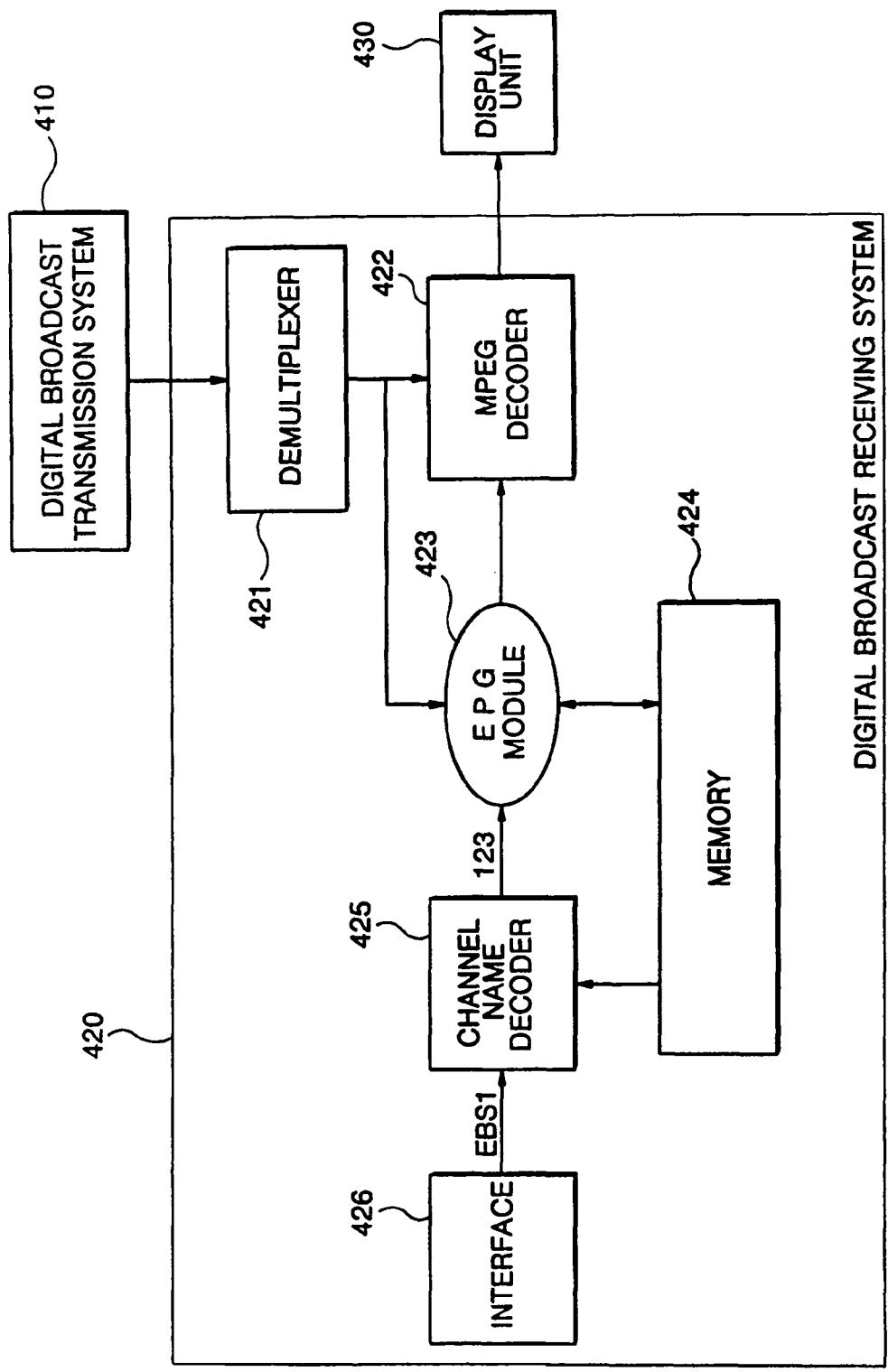
FIG. 4 is a block diagram illustrating a digital broadcasting system according to the present invention.

FIG. 4 is a block diagram illustrating a digital broadcasting receiving system 420 according to the invention. As shown in FIG. 4, the digital broadcasting system 420 of the invention includes a demultiplexer 421, an MPEG decoder 422, an EPG module 423, a memory 424, a channel name decoder 425 and an interface 426.

Among data transmitted from the digital broadcast transmission system 410, the demultiplexer 421 transmits multimedia data to the MPEG decoder 422 and system information data to the EPG module 423.

The MPEG decoder 422 converts a multimedia signal transmitted from the demultiplexer 421 into an MPEG format to output image and audio data of a selected digital broadcast channel to a display unit 430.

The EPG module 423 receives digital broadcast channel number from the channel name decoder 425, and controls a tuner (not shown) to receive data of a corresponding channel. If an error signal is received from the channel name decoder 425, the EPG module 423 displays an error message on the display unit 430. In addition, the EPG module 423 interprets system information transmitted from the demultiplexer 421 to output it to the display unit 430, and stores channel information such as channel number, abridged channel name and unabridged channel name in the memory 424.

The display unit 430 is a component to display multimedia data transmitted from the MPEG decoder and system information transmitted from the EPG module 423. Examples of the display unit 430 may include a TV, a projector and the like.

The memory 424 is a component to store an EPG database related with system information transmitted from the digital broadcast transmission system 410. The memory 424 is connected to the EPG module 423, and in the case of system information change, updates the EPG database.

Table 1 below shows an exemplary EPG database stored in the memory 424 of the digital broadcast receiving system 420 of the invention.

TABLE 1

EPG Database

| Channel Name | Abridged Channel Name | Channel No. | Remarks |
| --- | --- | --- | --- |
| EBS for Broadcasting College | EBS1 | 123 | EBS |
| EBS for Broadcasting College | EBS2 | 124 | Channel |
| EBS for Broadcasting College | EBS3 | 125 | Group |
| EBS for Broadcasting College | EBS4 | 126 | |
| YTN | YTN | 256 | |
| CJ Home Shopping | CJH | 328 | |

As shown in Table 1, an abridged channel name may consist of total 3 or 4 digits. The first three digits (e.g., EBS, YTN, CJH) are essential elements composed of alphabetic letters, and the last one digit (e.g., 1, 2, 3, 4) is an additional element composed of Arabic numbers. First the first three digit letters are preferably composed of those letters that are regarded as unique abbreviations of digital broadcast channels.

Furthermore, the first three alphabetic letters can be utilized as channel group information. For example, an EBS channel group may consist of EBS for Broadcasting College (EBS1), EBS for Aptitude Test Channel (EBS2), EBS for Culture Channel (EBS3) and EBS for Secondary Education Channel (EBS4). When a user inputs a channel group name (of three alphabetic letters), the digital broadcast receiving system displays channels of the corresponding channel group so that the user can select a desired channel.

Although the EPG database as described above only contains information about channel name, abridged channel name and channel number, it may also contain system information such as program name and program broadcast date.

The channel name decoder 425 is a component for converting an abridged channel name input by the user into a digital broadcast channel number. The channel name decoder 425 is connected to the memory 424, the interface 426 and the EPG module 423. The channel name decoder 425 searches an EPG database of the memory 424 for an abridged channel name input by the user and sends corresponding channel number to the EPG module 423. If a corresponding channel number does not exist, the channel name decoder 425 sends an error signal to the EPG module 423.

The interface 426 includes an input unit (remote, keyboard, etc.) available for the input of alphabetic letters and Arabic numbers. The user inputs the abridged name of a digital broadcast channel via the interface 426, which is then transmitted to the channel name decoder 425.

The operation of the digital broadcast will be described on for example a situation that a user inputs EBS1.

When the user inputs an abridged channel name of EBS1 via the interface 426, such as a remote controller, the channel name decoder 425 searches for a record having abridged channel name of EBS1 out of the EPG database of the memory 424 having system information as in Table 1. According to the above search, the channel name decoder 425 outputs channel number, matching with EBS1, to the EPG module 423, and the EPG module 423 allows a tuner to extract a signal corresponding to channel number.

Figure 5:
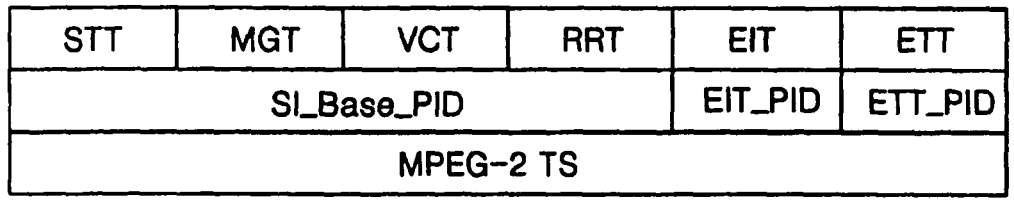
FIG. 5 is a table illustrating system information in use for an open cable system according to the present invention.

FIG. 5 is a table illustrating system information in use for an open cable system. Description will now be given of how abridged channel name information is included in system information.

System information used in an open cable system is transmitted as stored in a System Time Table (STT), a Master Guide Table (MGT), a Virtual Channel Table (VCT), a Rating Region Table (RRT), an Event Information Table (EIT) and an Extended Text Table (ETT), which are included in a Program and System Information Protocol (PSIP) according to the present invention.

Of the above tables, the Virtual Channel Table (VCT) is a field comprising abridged channel information, according to the present invention. The VCT field is co-related with a Network Information Table (NIT) having physical information of a local network of Program Specification Information (PSI). Furthermore, the NIT includes private descriptors of each broadcaster by program unit.

Table 2 below shows a private descriptor including an abridged channel name according to the invention.

TABLE 2

Standard Structure of a Private Descriptor

| Descriptor Name | Abbreviation Descriptor |
|---|---|
| Descriptor Tag | 0xf0 |
| Descriptor Length | 4 |
| Abbreviation Name | EBS1 |

As seen in Table 2 above, the private descriptor includes a descriptor name, a tag, length and an abridged channel name. The abridged channel name included in the private descriptor is co-related with a VCT field, and thus can be transmitted to the digital broadcast receiving system as included in system information.

Figure 6:
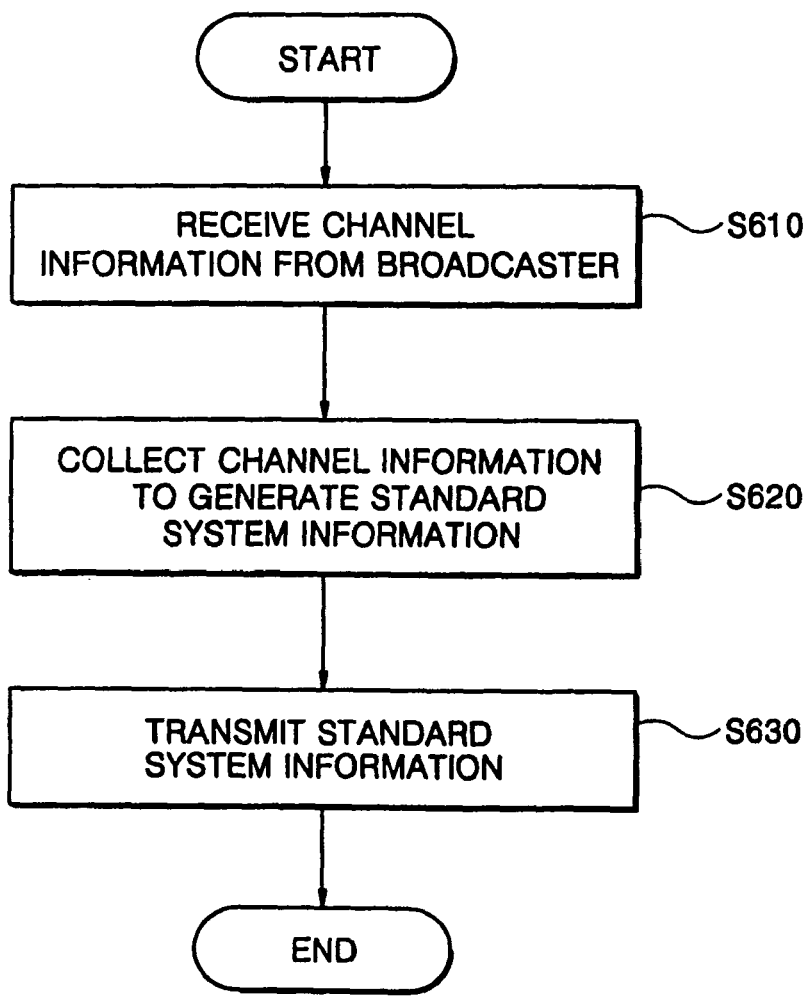
FIG. 6 is a flowchart illustrating a process executed by a digital broadcast transmission system to transmit system information according to the present invention.

FIG. 6 is a flowchart illustrating a process executed by a digital broadcast transmission system to transmit system information according to the invention.

The digital broadcast transmission system receives channel information including channel names, channel numbers and abridged channel names from several broadcasters in S610.

The digital broadcast transmission system collects the channel information including channel names, channel numbers and abridged channel names and generates standard system information including channel numbers and abridged channel names in S620. To be specific, channel numbers are included in the Virtual Channel Table (VCT) of system information, and abridged channel names are included in private descriptor of the Network Information Table (NIT) co-related with the Virtual Channel Table (VCT).

Such standard system information, via modulation, is transmitted to the digital broadcast receiving system in S630.

Figure 7:
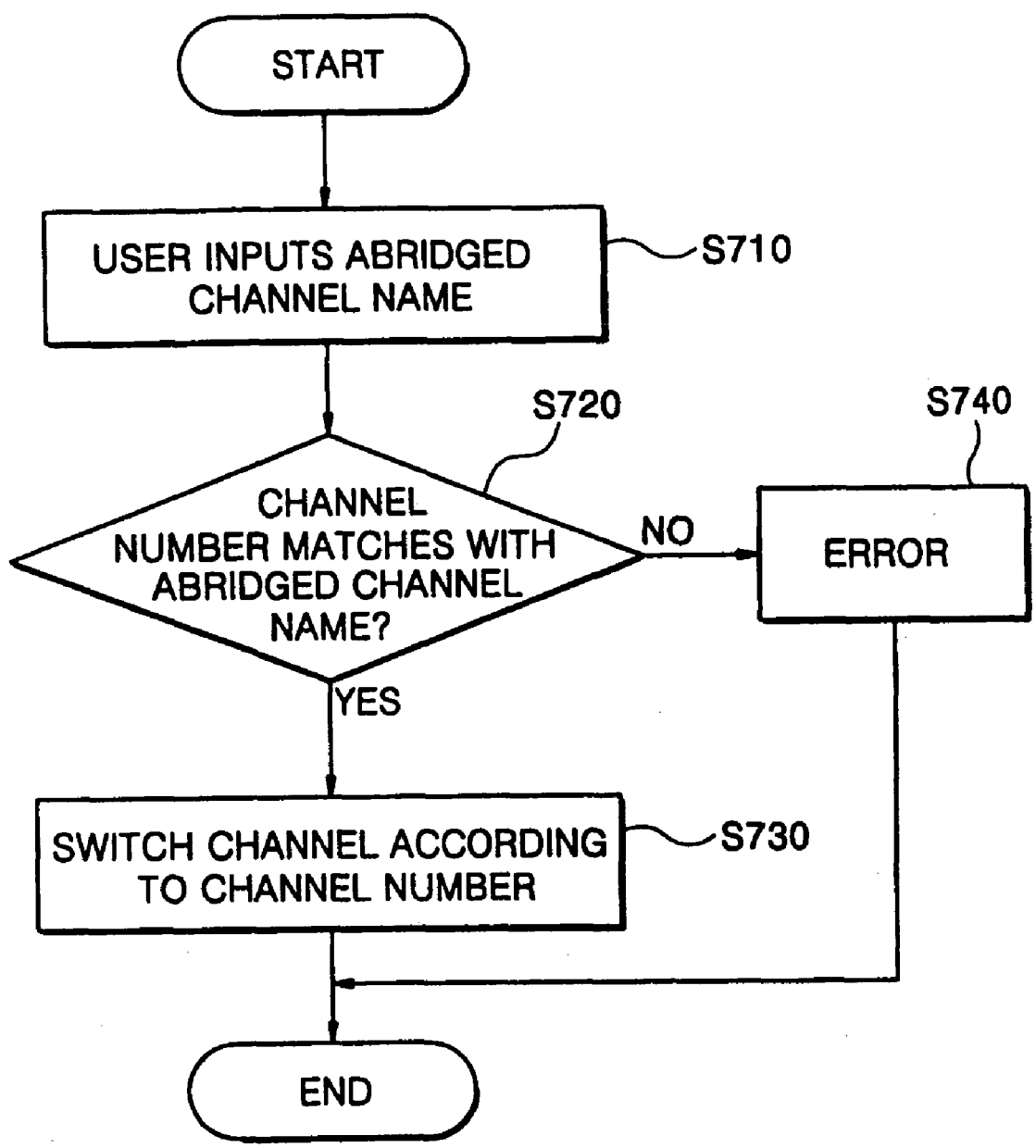
FIG. 7 is a flowchart illustrating a process for switching broadcast channels of a digital broadcast receiving system according to the present invention.

FIG. 7 is a flowchart illustrating a process for switching broadcast channels of a digital broadcast receiving system according to the invention.

First, a user inputs abridged channel name by using, for example, a remote controller or a keypad of the digital broadcast receiving system in S710.

The digital broadcast receiving system, by comparison, in S720, with the information in the EPG database, which stores system information on abridged channel names and corresponding channel numbers, detects a correspondingly stored abridged channel name and converts the abridged channel name input by the user into the corresponding channel number.

In S730, the digital broadcast receiving system switches digital broadcast channels using a tuner in response to the generated channel number corresponding to the input abridged channel name.

If there is no channel number matching with the abridged channel name, or there is no stored the abridged channel name corresponding to the the abridged channel name inputted by the user in the EPG database, the digital broadcast receiving system displays an error message notifying that the abridged channel name is wrong and then completes operation in S740.

According to the apparatus and the method for switching channels in a digital broadcast system of the invention, the user can easily switch digital broadcast channels by inputting abridged channel name without inputting a channel number from memory or searching all broadcast program information. This as a result brings in effects of facilitating channel switching as well as reducing time consumption according to channel switching.

While the present invention has been shown and described in connection with the preferred embodiments, it will be apparent to those skilled in the art that modifications and variations can be made without departing from the spirit and scope of the invention as defined by the appended claims.

What is claimed is:

1. A digital broadcast system, comprising:
a digital broadcast transmitting system to transmit a digital signal having system information data comprising abridged channel names of digital broadcast channels and media data, according to a Program and System Information Protocol (PSIP); and
a digital broadcast receiving system to store the system information data comprising the abridged channel names and corresponding channel numbers of digital broadcast channels, to search the stored system information data in response to input of an input abridged channel name, to output a corresponding channel number if a stored abridged channel name matches the input abridged channel name, and to switch channels according to the output channel number,
wherein said channel name information and channel number information are recorded in a virtual channel table (VCT) of the PSIP, and
wherein said abridged channel name is recorded in a private descriptor of a Network Information table (NIT) correlating with the virtual channel table (VCT) of the PSIP.

2. The digital broadcast system of claim 1, wherein said digital broadcast receiving system comprises:
a Moving Picture Experts Group (MPEG) decoder to decode the media data of the digital signal to display on a display unit;
an electronic program guide (EPG) module to store channel information comprising the channel numbers of the digital broadcast channels, the corresponding abridged channel names, and corresponding unabridged channel names in a memory, and to control a tuner to perform the switching if the stored abridged channel name matches the input abridged channel name;
a channel name decoder to receive the input abridged channel name input by a user and to check said memory for a matching abridged channel name, the channel name decoder providing the channel number corresponding to the matching abridged channel name to the EPG module to control the switching by said tuner.

3. The digital broadcast system of claim 2, wherein said digital broadcast receiving system further comprises:
a demodulator to receive the digital signal transmitted according to the PSIP, the demodulator providing the media data to the MPEG decoder and providing the system information data to the EPG module; and
an interface to receive the input abridged channel name input from the user via an input device.

4. The digital broadcast system of claim 2, wherein said EPG module is configured to output an error message for display on the display unit if the channel name decoder fails to find a stored abridged channel name corresponding to the input abridged channel name.

5. A method for switching digital broadcast channels, comprising:
storing system information comprising abridged channel names and corresponding channel numbers of digital broadcast channels; and
in response to input of an abridged channel name to switch channels, searching the stored abridged channel names for a match to the input abridged channel name, matching the input abridged channel name to a corresponding channel number according to the stored corresponding channel numbers, and switching channels according to the corresponding channel number,
wherein said channel name information and channel number information are recorded in a virtual channel table (VCT) of a Program and System Information Protocol (PSIP), and
wherein said abridged channel name is recorded in a private descriptor of a Network Information table (NIT) correlating with the virtual channel table (VCT) of the PSIP.

6. The method of claim 5, further comprising outputting an error message for display when no stored channel number exists corresponding to the input abridged channel name.

7. The method of claim 5, further comprising:
collecting channel information provided from at least one broadcaster, generating the system information comprising the abridged channel names and corresponding channel numbers, and transmitting the system information; and
receiving and storing the transmitted system information, searching the stored system information for an abridged channel name matching the input abridged channel name, generating a corresponding channel number corresponding to the matched abridged channel name, and switching channels according to the generated channel number.

8. The method of claim 7, further comprising outputting an error message for display when no stored channel number exists corresponding to the input abridged channel name.

9. The method of claim 7, wherein the system information comprises at least one selected from a group consisting of a channel name, a channel description, a broadcast program description, and a program identification number.

10. A digital broadcast receiving system configured to store system information comprising abridged channel names and corresponding channel numbers of digital broadcast channels, to search the stored system information for an input abridged channel name, to convert the input abridged channel name to a corresponding channel number, and to switch channels according to the corresponding channel number,
wherein said channel name information and channel number information are recorded in a virtual channel table (VCT) of a Program and System Information Protocol (PSIP), and
wherein said abridged channel name is recorded in a private descriptor of a Network Information table (NIT) correlating with the virtual channel table (VCT) of the Program and System Information Protocol (PSIP).

11. The digital broadcast receiving system of claim 10, wherein said digital broadcast receiving system comprises:
a Moving Picture Experts Group (MPEG) decoder to decode media data of a digital signal to display on a display unit;
an electronic program guide (EPG) module to store channel information comprising the channel numbers of the digital broadcast channels, the corresponding abridged channel names, and corresponding unabridged channel names in a memory, and to control a tuner to perform the switching if the stored abridged channel name matches the input abridged channel name; a channel name decoder to receive the input abridged channel name input by a user and to check said memory for a matching abridged channel name, the channel name decoder providing the channel number corresponding to the matching abridged channel name to the EPG module to control the switching by said tuner.

12. The digital broadcast receiving system of claim 10, wherein the system is further configured to output an error message if a stored abridged channel name corresponding to the inputted abridged channel name does not exist in the stored system information.

13. The digital broadcast receiving system of claim 10, comprising a memory to store at least one selected from a group consisting of a channel name, a channel description, a broadcast program description, and a program identification number.

14. The digital broadcast receiving system of claim 12, wherein the system is further configured to display channel information corresponding to the input abridged channel name.

* * * * *